United States Patent
Agarwal et al.

(10) Patent No.: US 12,175,801 B1
(45) Date of Patent: Dec. 24, 2024

(54) SYSTEM OF AND METHOD FOR PREDICTING AND/OR CASTING A VOTE VIA BRAIN ACTIVITY

(71) Applicant: University of South Florida, Tampa, FL (US)

(72) Inventors: Rupal Agarwal, Tampa, FL (US); Marvin Andujar, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 18/503,781

(22) Filed: Nov. 7, 2023

Related U.S. Application Data (60) Provisional application No. 63/423,588, filed on Nov. 8, 2022.

(51) Int. Cl.
*G07C 13/00* (2006.01)
*G06F 3/01* (2006.01)

(52) U.S. Cl.
CPC ............ *G07C 13/00* (2013.01); *G06F 3/015* (2013.01)

(58) Field of Classification Search
CPC ............................... G07C 13/00; G06F 3/015
USPC .......................................................... 235/51
See application file for complete search history.

(56) References Cited

U.S. PATENT DOCUMENTS

| | | | |
|---|---|---|---|
| 2019/0294243 A1* | 9/2019 | Laszlo | G06N 20/00 |
| 2021/0290171 A1* | 9/2021 | Katnani | A61B 5/0082 |
| 2021/0374569 A1* | 12/2021 | Jezewski | G06N 20/00 |
| 2023/0315203 A1* | 10/2023 | Wei | G16H 20/30 |
| | | | 702/19 |

FOREIGN PATENT DOCUMENTS

CN 114415842 A * 4/2022 ............. A61B 5/378

OTHER PUBLICATIONS

Bederson, B.B., Lee, B., Sherman, R.M., Herrnson, P.S., Niemi, R.G. Electronic voting system usability issues. In: Proceedings of the SIGCHI conference on Human factors in computing systems. Vol. No. 5, Issue No. 1, pp. 145-152 (2003).

(Continued)

*Primary Examiner* — Michael G Lee
*Assistant Examiner* — David Tardif
(74) *Attorney, Agent, or Firm* — Owen G. Behrens; Smith & Hopen, P.A.

(57) ABSTRACT

Described herein relates to a system of and method for predicting and/or casting votes via a brain-computer interface. The voting system may be configured to allow at least one user to input and/or cast a vote using their brain activity. Additionally, the voting system uses a machine learning and/or classifying algorithm for classification of the brain data and prediction of the vote of the user. The voting system is also configured to synchronize brain activity to the at least one user, such that each vote may be correctly tallied to the at least one user, eliminating fraudulent voting via false identification, or the like. The voting system may also allow at least one user having a motor disability to vote without requiring any movement and/or physical assistance, such that the at least one user with a motor disability may maintain voting privacy.

20 Claims, 6 Drawing Sheets

(56) References Cited

OTHER PUBLICATIONS

Botrel, L., Holz, E.M., Kübler, A.: Brain painting v2: evaluation of p300-based brain-computer interface for creative expression by an end-user following the user-centered design. Brain-Computer Interfaces 2:2-3, 135-149 (2015).

Farwell, L.A., Donchin, E.: Talking off the top of your head: toward a mental prosthesis utilizing event-related brain potentials. Electroencephalography and clinical Neurophysiology 70(6), 510-523 (1988).

Hoffmann, U., Garcia, G., Vesin, J.M., Diserens, K., Ebrahimi, T.: A boosting approach to p300 detection with application to brain-computer interfaces. In: Conference Proceedings. 2nd International IEEE EMBS Conference on Neural Engineering, pp. 97-100. (2005).

Kaplan, A.Y., Shishkin, S.L., Ganin, I.P., Basyul, I.A., Zhigalov, A.Y.: Adapting the p300-based brain-computer interface for gaming: a review. IEEE Transactions on Computational Intelligence and AI in Games 5(2), 141-149, Jun. 2013.

Krusienski, D.J., Sellers, E.W., Cabestaing, F., Bayoudh, S., McFarland, D.J., Vaughan, T.M., Wolpaw, J.R.: A comparison of classification techniques for the p300 speller. Journal of neural engineering 3 (2006) pp. 299-305.

Manyakov, N.V., Chumerin, N., Combaz, A., Van Hulle, M.M.: Comparison of classification methods for p300 brain- omputer interface on disabled subjects. Computational intelligence and neuroscience 2011, Article ID 519868, 12 pages (2011).

McClinton, W., Caprio, D., Laesker, D., Pinto, B., Garcia, S., Andujar, M.: P300-based 3d brain painting in virtual reality. In: Extended Abstracts of the 2019 CHI Conference on Human Factors in Computing Systems. CHI 2019, May 4-9, 2019, Glasgow, Scotland, UK.

McClinton, W., Garcia, S., Andujar, M.: An immersive brain painting: the effects of brain painting in a virtual reality environment. In: International Conference on Human-Computer Interaction. pp. 436-445 (2019).

Mugler, E.M., Ruf, C.A., Halder, S., Bensch, M., Kubler, A.: Design and implementation of a p300-based brain-computer interface for controlling an internet browser. IEEE Transactions on Neural Systems and Rehabilitation Engineering18(6), 599-609 (2010).

Ruiz-Blondet, M.V., Jin, Z., Laszlo, S. Cerebre: A novel method for very high accuracy event-related potential biometric identification. IEEE Transactions on Information Forensics and Security 11(7), 1618-1629 (2016).

Sellers, E.W., Donchin, E.: A p300-based brain-computer interface: initial tests by ALS patients. Clinical neurophysiology 117(3), 538-548 (2006).

Szafir, D., Mutlu, B.: Artful: adaptive review technology for flipped learning. In: Proceedings of the SIGCHI Conference on Human Factors in Computing Systems. CHI 2013, Apr. 27-May 2, 2013, Paris, France. pp. 1001-1010.

\* cited by examiner

SYSTEM OF AND METHOD FOR PREDICTING AND/OR CASTING A VOTE VIA BRAIN ACTIVITY

CROSS-REFERENCE TO RELATED APPLICATIONS

This nonprovisional application claims priority to U.S. Provisional Application No. 63/423,588 entitled "SYSTEM OF AND METHOD FOR PREDICTING AND/OR CASTING A VOTE VIA BRAIN ACTIVITY" filed Nov. 8, 2022 by the same inventors, all of which is incorporated herein by reference, in its entirety, for all purposes.

BACKGROUND OF THE INVENTION

1. Field of the Invention

This invention relates, generally, to voting systems. More specifically, it relates to a system of and method for predicting and casting a vote of at least one user based on a brain activity of the at least one user.

2. Brief Description of the Prior Art

Voting is the cornerstone of democracy. It is a crucial process with the help of which a democratic society elects its government. Therefore, a safe, and reliable voting system is essential not just for the democratic nation, but also for the voter's trust and secrecy of the votes. Different forms of voting methods are used throughout the world, including paper ballots and computer systems comprising touch screens so at least one user may input their voting selection within the computer system. While the above-mentioned voting methods are widely used in many countries, they have several limitations. Both methods require the use of hands to make selections on a ballot paper or a screen, making it difficult for people who have motor disabilities to cast their votes. Another potential drawback of electronic voting is the use of a computer mouse to navigate the voting application. This can likely lead to more errors being made by the older adults because of their possible lack of hand-eye coordination and manual dexterity.

As stated above, the current voting methods such as ballot papers and electronic voting machines that use touchscreens are difficult to use as they require the use of hands to interact with the system. The electronic voting systems require the use of a computer mouse to navigate the voting application, leading the older adults to make more errors because of their possible lack of manual dexterity. Additionally, voting systems requiring the use of computer mouses and/or punch-out cards may pose a serious issue to individuals having severe physical disabilities, such as Amyotrophic Lateral Sclerosis (hereinafter "ALS"), as they are unable to grasp a pen and/or operate the graphical interface of the voting system.

Furthermore, the current voting methods, described above, are susceptible to potential voter fraud, such as individuals having fake voter IDs. As an individual may pose as any person, it is exceedingly difficult to verify the accuracy of each potential voter based only on the information they have at present. In this manner, current forms of voting security includes month long verification of the individuals, current address, etc. However, even if all these aspects are met, an individual still may forge another individuals identity and fraudulently vote as the other individual. Thus, the current voting system methods are unable to automatically verify, in-real, time the authenticity of a potential voter while providing a hands-free interface to allow individuals to automatically cast their vote.

Accordingly, what is needed is safe, easy-to-use system and method system and method that allows for rapid and efficient hands-free voting. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to a method of automatically predicting a vote and/or casting a vote. In an embodiment, the method may comprise the following steps: (a) presenting, via a processor of a computing device, a plurality of stimuli on the display device associated with the computing device to a user for a predetermined amount of time; (b) recording, via a neurological headset communicatively coupled to the processor of the computing device, an electrical activity of a brain of the user, based on a response to each of the plurality of stimuli presented on the display device; (c) comparing, via the processor of the computing device, the electrical activity of the brain of the user for each stimuli of the plurality of stimuli to a predetermined electrical activity associated with a selection by the user; and (d) automatically predicting and/or casting, via the processor of the computing device, the vote of the user by: (i) based on a determination that the electrical activity of the brain of the user for a stimuli of the plurality of stimuli matches the predetermined electrical activity of the brain associated with the selection by the user, transmitting a notification indicative of a successfully predicted vote and/or casted vote to the display device associated with the computing device; and (ii) based on a determination that the electrical activity of the brain of the user for a stimuli of the plurality of stimuli does not match the predetermined electrical activity of the brain associated with the selection by the user, re-presenting the plurality of stimuli for the predetermined amount of time.

In some embodiments, the processor may further comprise at least one machine learning algorithm and/or at least one classifier or both. In this manner, the method may further comprise the step of, filtering, via the at least one classifier of the processor, at least one P300 event-related potential from the electrical activity of the brain of the user. In addition, in these other embodiments, the computing device may further comprise a memory, such that the electrical activity associated with a selection by the user may be inputted into the memory of the computing device.

As such, in these other embodiments, the electrical activity associated with a selection by the user may also comprise at least one predetermined P300 event-related potential. Accordingly, the step of comparing the electrical activity of the brain of the user for each stimuli of the plurality of stimuli to an electrical activity associated with a selection by the user may further comprise the step of, identifying, via the at least one classifier of the processor, the selected stimuli of the plurality of stimuli based on the filtered P300 event-related potential. In addition, in these other embodiments, the step of comparing the electrical activity of the brain of the user for each stimuli of the plurality of stimuli to an electrical activity associated with a selection by the user may also comprise the step of, calculating, via the at least one classifier of the processor, a likelihood of accuracy for the selected stimuli based on the comparison between the filtered P300 event-related potential and the at least one predetermined P300 event-related potentials dataset.

Additionally, in some embodiments, the method may further comprise the step of, inputting, via the processor of the computing device, the filtered P300 even-related potential into the at least one predetermined P300 event-related potentials dataset. In this manner, the method may also comprise the step of, retraining, via the at least one machine learning algorithm of the processor, the likelihood of accuracy of the at least one predetermined P300 event-related potentials dataset based on at least one of the inputted filtered P300 event-related potential of the user, such that the predetermined amount of time for presenting the plurality of stimuli may be updated (e.g., increased and/or decreased based on the likelihood of accuracy).

In some embodiments, the plurality of stimuli may be presented on the display device as a N×N matrix. In some embodiments, the step of presenting the plurality of stimuli, may further comprise the step of, transitioning, via the at least one processor of the computing device, each of the plurality of stimuli between a gray-scale color to an enhanced color scheme at a predetermined rate.

Moreover, another aspect of the present disclosure pertains to a voting optimization system for automatically predicting and/or casting a vote. In an embodiment, the voting optimization system may comprise the following: (a) a computing device having a processor; (b) a neurological headset having a display device, the neurological headset being communicatively coupled to the processor of the computing device; and (c) a non-transitory computer-readable medium operably coupled to the processor, the computer-readable medium having computer-readable instructions stored thereon that, when executed by the processor, cause the voting optimization system to automatically predict and/or cast the vote of a user by executing instructions including, but not limited to: (i) presenting, via the processor of the computing device, a plurality of stimuli on the display device associated with the computing device to the user for a predetermined amount of time; (ii) recording, via the neurological headset communicatively coupled to the processor of the computing device, an electrical activity of a brain of the user, based on a response to each of the plurality of stimuli presented on the display device; (iii) comparing, via the processor of the computing device, the electrical activity of the brain of the user for each stimuli of the plurality of stimuli to a predetermined electrical activity associated with a selection by the user; and (iv) automatically predicting and/or casting, via the processor of the computing device, the vote of the user by: (A) based on a determination that the electrical activity of the brain of the user for a stimuli of the plurality of stimuli matches the predetermined electrical activity of the brain associated with the selection by the user, transmitting a notification indicative of a successfully predicted vote and/or casted vote to the display device; and (B) based on a determination that the electrical activity of the brain of the user for a stimuli of the plurality of stimuli does not match the predetermined electrical activity of the brain associated with the selection by the user, re-presenting the plurality of stimuli for the predetermined amount of time.

In some embodiments, the processor may further comprise at least one machine learning algorithm and/or at least one classifier. In this manner, the executed instructions may further comprise the step of, filtering, via the at least one classifier of the processor, at least one P300 event-related potential from the electrical activity of the brain of the user.

In these other embodiments, the computing device may also comprise a memory, such that the electrical activity associated with a selection by the user may be inputted into the memory of the computing device.

In addition, in these other embodiments, the electrical activity associated with a selection by the user may also comprise at least one predetermined P300 event-related potential. As such, the executed instructions step of comparing the electrical activity of the brain of the user for each stimuli of the plurality of stimuli to an electrical activity associated with a selection by the user may further comprise the step of, identifying, via the at least one classifier of the processor, the selected stimuli of the plurality of stimuli based on the filtered P300 event-related potential. Furthermore, the executed instructions step of comparing the electrical activity of the brain of the user for each stimuli of the plurality of stimuli to an electrical activity associated with a selection by the user may also comprise the step of, calculating, via the at least one classifier of the processor, a likelihood of accuracy for the selected stimuli based on the comparison between the filtered P300 event-related potential and the at least one predetermined P300 event-related potentials dataset.

In some embodiments, the executed instructions may also comprise the step of inputting, via the processor of the computing device, the filtered P300 even-related potential into the at least one predetermined P300 event-related potentials dataset. In this manner, the executed instructions may further comprise the step of retraining, via the at least one machine learning algorithm of the processor, the likelihood of accuracy of the at least one predetermined P300 event-related potentials dataset based on at least one of the inputted filtered P300 event-related potential of the user, such that the predetermined amount of time for presenting the plurality of stimuli may be updated.

Furthermore, in some embodiments, the voting optimization system may comprise the following components, including but not limited to: (1) brain data acquisition, (2) data processing, (3) classification, and/or (4) output/feedback. In this embodiment, the voting optimization system's voting interface may consist of a matrix containing stimuli of candidates that the user can vote for. These stimuli may be originally in grey color and are displayed on a computer screen. While the application is in use, the stimuli may transition between the blunted stimuli and the enhanced stimuli at regular intervals. As such, in this embodiment, the user may be required to be disposed in front of a display device of the voting optimization system and may be required to focus for an amount of time on the flashing stimuli of the target stimuli in order for the at least one user cast a vote for their target stimuli.

As such, in some embodiments, the acquired electrical activity of the at least one user during the at least one voting session may be filtered to acquire at least one brain frequency and/or brain wavelength and/or may then be averaged and/or decimated to get the relevant P300 data sample from the electrical activity of the at least one user. In the end, the data samples may be passed to a machines learning classifier that predicts the vote of the user. The present invention may also be able to predict the votes of the users with high accuracy (e.g., likelihood of accuracy).

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims. Furthermore, the use of certain terms in various places in the specification, described herein, are for illustration and should not be construed as limiting.

Definitions

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

The techniques introduced here can be embodied as special-purpose hardware (e.g. circuitry), as programmable circuitry appropriately programmed with software and/or firmware, or as a combination of special-purpose and programmable circuitry. Hence, embodiments may comprise a computer readable medium having stored thereon instructions which may be used to program a computing device. The computer readable medium may be a computer readable signal medium and/or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of the foregoing. In the context of this document, a computer readable storage medium may be any tangible medium that can contain and/or store a program for use by and/or in connection with an instruction execution system, apparatus, and/or device.

The computer readable signal medium may include a propagated data signal with computer readable program PIN embodied therein, for example, in baseband or as part of a carrier wave. Such a propagated signal may take any of a variety of forms, including, but not limited to, electromagnetic, optical, and/or any suitable combination thereof. A computer readable signal medium may be any computer readable medium that is not a computer readable storage medium and that can communicate, propagate, or transport a program for use by or in connection with an instruction execution system, apparatus, or device.

Program PIN embodied on a computer readable medium may be transmitted using any appropriate medium, including but not limited to wireless, wire-line, optical fiber cable, radio frequency, etc., and/or any suitable combination of the foregoing. Computer program PIN for carrying out operations for aspects of the present invention may be written in any combination of one or more programming languages, including an object oriented programming language such as Java, C#, C++, Python, MATLAB, or the like and conventional procedural programming languages, such as the "C" programming language and/or similar programming languages.

Aspects of the present invention are described below with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computing device (e.g., computer), special purpose computing device (e.g., computer), and/or other programmable data processing apparatus to produce a machine, such that the instructions, which execute via the processor of the computing device (e.g., computer) and/or other programmable data processing apparatus, create means for implementing the functions/acts specified in the flowchart and/or block diagram block or blocks.

These computer program instructions may also be stored in a computer readable medium that can direct a computing device (e.g., computer), other programmable data processing apparatus, and/or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, and/or other devices to cause a series of operational steps to be performed on the computer, other programmable apparatus and/or other devices to produce a computer implemented process such that the instructions which execute on the computing device (e.g., computer) and/or other programmable apparatus provide processes for implementing the functions/acts specified in the flowchart and/or block diagram block or blocks.

As used herein, the term "communicatively coupled" refers to any coupling mechanism configured to exchange information (e.g., at least one electrical signal) using methods and devices known in the art. Non-limiting examples of communicatively coupling may include Wi-Fi, Bluetooth, wired connections, wireless connection, quantum, and/or magnets. For ease of reference, the exemplary embodiment described herein refers to Wi-Fi and/or Bluetooth, but this description should not be interpreted as exclusionary of other electrical coupling mechanisms.

As used herein, the term "neurological headset" refers to any headset known in the art which may be configured to detect and/or read at least one brain wavelength and/or at least one brain frequency. Non-limiting examples of the neurological headset may include an Enobio® headset, a virtual-reality (hereinafter "VR") headset, a mixed-reality (hereinafter "MR") headset, and/or an augmented-realty (hereinafter "AR") headset. For ease of reference, the exemplary embodiment, described herein, refers to an Enobio® headset, but this description should not be interpreted as exclusionary of other headsets configured to detect and/or read at least one brain wavelength and/or at least one brain frequency.

As used herein, the term "electrical activity" refers to any electrical stimulation, electrical charge, and/or electrochemical release from the brain and/or neurological system known in the art. For ease of reference, the exemplary embodiment, described herein, refers to electrical charges released from the brain, but this description should not be interpreted as exclusionary of other electrical and/or electrochemical releases from the brain.

As used herein, the term "focus" refers to concentrating on a target stimuli on a display device of a voting optimization system, such that a P300 wave may be detected in the electrical activity of the brain of at least one user.

As used herein, the terms "about," "approximately," or "roughly" refer to being within an acceptable error range for the particular value as determined by one of ordinary skill in the art, which will depend in part on how the value is measured or determined (i.e., the limitations of a measurement system), (i.e., the degree of precision required for a particular purpose, such as predicting and/or casting a vote based on brain activity). As used herein, "about," "approximately," or "roughly" may refer to within +25% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Brain-Voting Interface System

The present disclosure pertains to a system and method of casting a vote via a brain-computer interface. In an embodiment, the present disclosure may comprise a voting optimization system, such that the voting optimization system may comprise at least one machine learning-algorithm.

Figure 1:
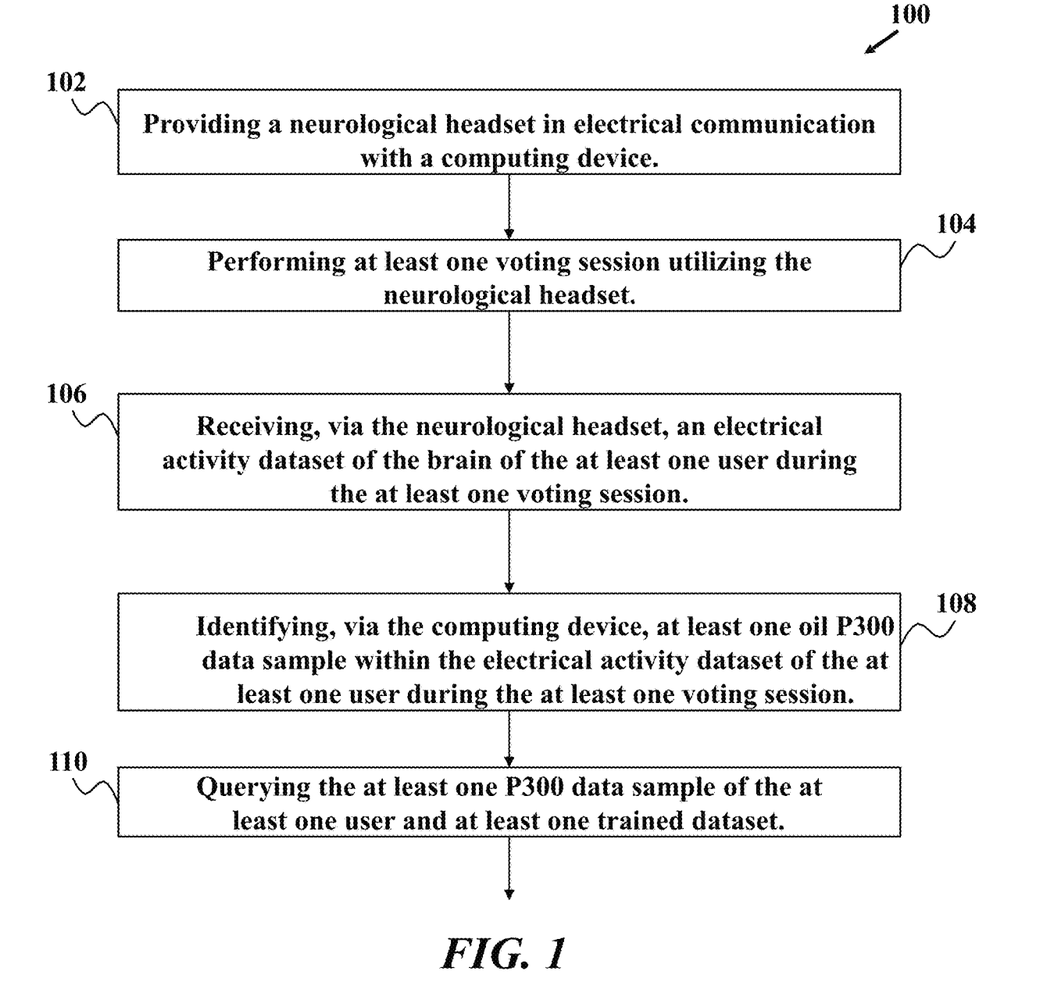
FIG. 1 is a process flow diagram depicting a method of automatically predicting and/or casting a vote for at least one user, according to an embodiment of the present disclosure.

FIG. 1 depicts an exemplary process flow diagram depicting a method 100 of automatically casting a vote of at least one user based on a brain frequency of the at least one user, according to an embodiment of the present disclosure. The steps delineated in FIG. 1 are merely exemplary of an order of casting a vote of at least one user based on the brain frequency of the at least one user. The steps may be carried out in another order, with or without additional steps included therein.

As shown in FIG. 1, in an embodiment, method 100 begins with step 102, providing a voting optimization system comprising a neurological headset configured to be worn by at least one user during at least one voting session and/or a computing device. As such, the neurological headset may be configured to be communicatively coupled (e.g., in electrical communication) with the computing device comprising the following, including but not limited to, a processor, a graphical user interface, and/or a display device.

Figure 2:
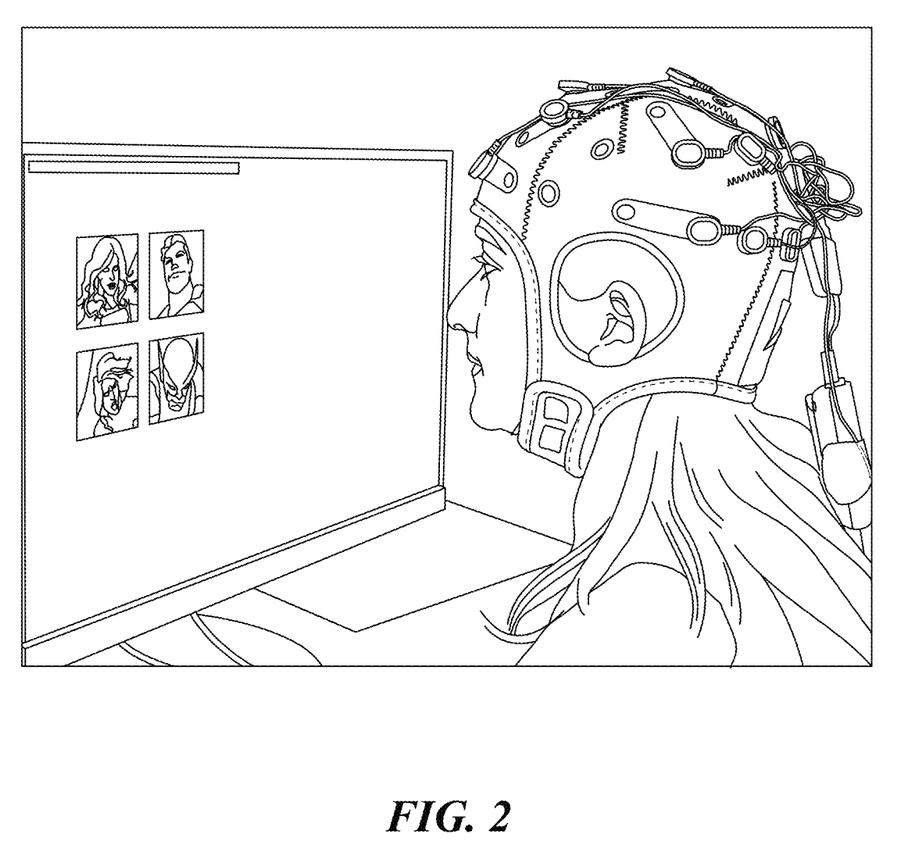
FIG. 2 is an embodiment of a neurological headset of a voting optimization system as worn by at least one user, according to an embodiment of the present disclosure.
Figure 3:
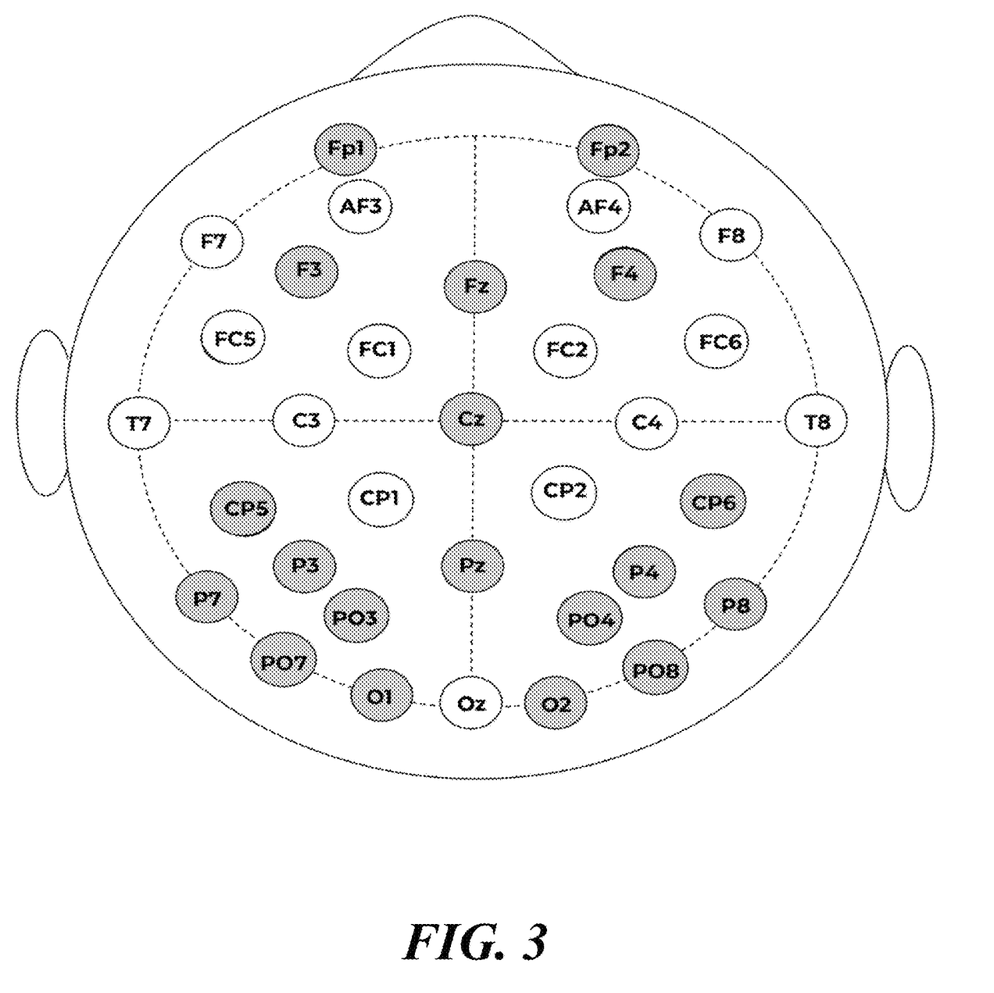
FIG. 3 is an embodiment of an electrode and/or sensor location of the neurological headset of the voting optimization system of FIG. 2, according to an embodiment of the present disclosure.

As shown in FIGS. 2-3, in conjunction with FIG. 1, the neurological headset may be configured to record and/or transmit electrical activity (e.g., at least one brain frequency and/or at least one brain wavelength) of the at least one user to the computing device. In this manner, in this embodiment, the neurological headset may be wireless, such that the neurological headset may communicatively couple with the computing device via any wireless mechanism known in the art (e.g., Bluetooth and/or radio frequency). Moreover, in this embodiment, the neurological headset may be lightweight. Additionally, the neurological headset may also comprise at least one electrode and/or sensor configured to read electrical activity from the user's scalp. As such, the neurological headset may be configured to collect the electrical activity of the at least one user with at least one electrode and/or sensor disposed about at least one of the following positions as shown in FIG. 3, including but not limited to, Fp1, Fp2, F3, Fz, F4, Cz, CP5, CP6, P7, P3, Pz, P4, P8, PO7, PO3, PO4, PO8, O1 and/or O2 locations. Accordingly, in an embodiment, the at least one electrode and/or sensor may be disposed about the scalp of the at least one user in at least one portion of a parietal region of a brain of the at least one user, such that at least one P300 wave may be captured. Furthermore, in some embodiments, at least one additional electrode and/or sensor may also be disposed about at least one portion of the scalp of the at least one user in at least one portion of a frontal lobe region of the brain of the at least one user, in addition to at least one additional electrode and/or sensor being disposed about at least one portion of the parietal region of the brain of the at least one user. In this manner, as known in the art, the frontal lobe region and/or the parietal region of the brain carry relevant information for the detection of the at least one P300 wave activity of the at least one user during the at least one voting session. As shown in FIG. 3, in some embodiments, a position of the at least one sensor and/or electrode and/or a position of the at least one additional sensor and/or electrode location may comprise a standardized location based upon the 10-20 International System.

Referring again to FIG. 1, in an embodiment, method 100, at step 102, subsequent to providing a neurological headset, the at least one user may perform at least one voting session utilizing the neurological headset, such that the neurological headset and/or a memory of the computing device may be configured to record the electrical activity of the at least one user during the at least one voting session. Next, at step 104, the computing device may receive, via the neurological headset and/or the memory of the computing device, the transmitted and/or recorded electrical activity of the user during the at least one voting session.

As such, in an embodiment, the voting optimization system may require the at least one user to complete at least one voting session while wearing the neurological headset. For example, in some embodiments, the at least one user may be required to complete at least six (6) voting sessions, such that the neurological headset may record and/or transmit a substantial data set to the computing device in order to accurately predict vote of the at least one user. In this manner, however, in an embodiment, the total amount of voting sessions required by the voting optimization system may increase and/or decrease based on the following, including but not limited to, the amount of candidates which may be selected in the voting session, the amount of selections required during the voting session (e.g., voting for a governor candidate, senate candidate, and/or a presidential candidate in one voting session), the electrical activity of the brain of the at least one user, and/or any metric known in the art which may increase the length of time of a voting session.

Figure 4:
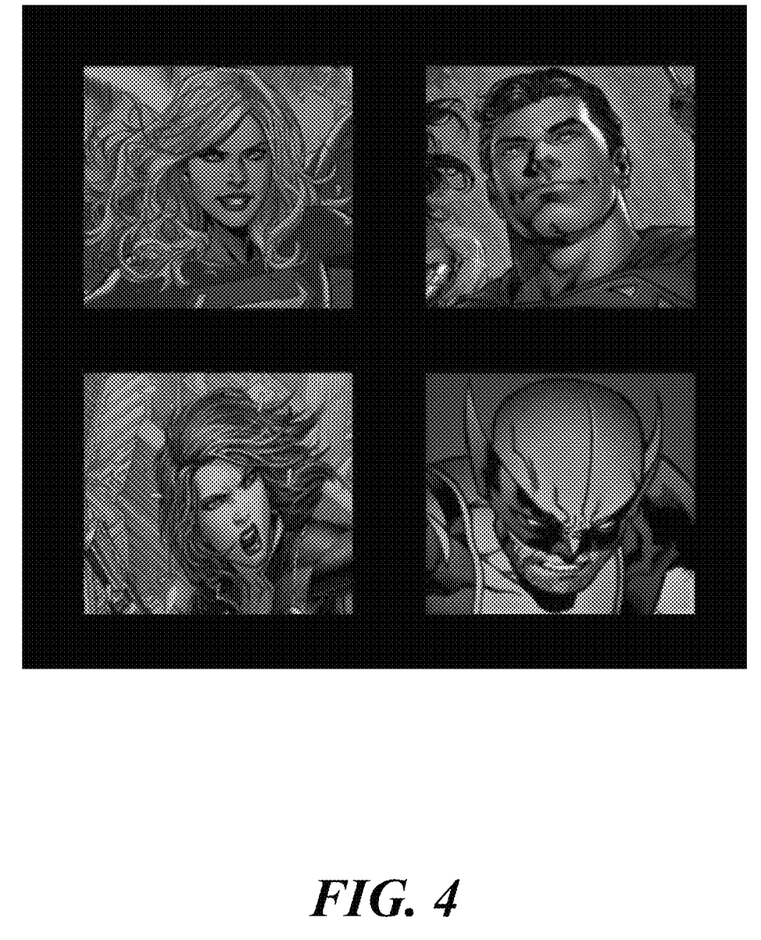
FIG. 4 is an embodiment of an initial interface of a display device of a voting optimization system during a voting session, according to an embodiment of the present disclosure.
Figure 5:
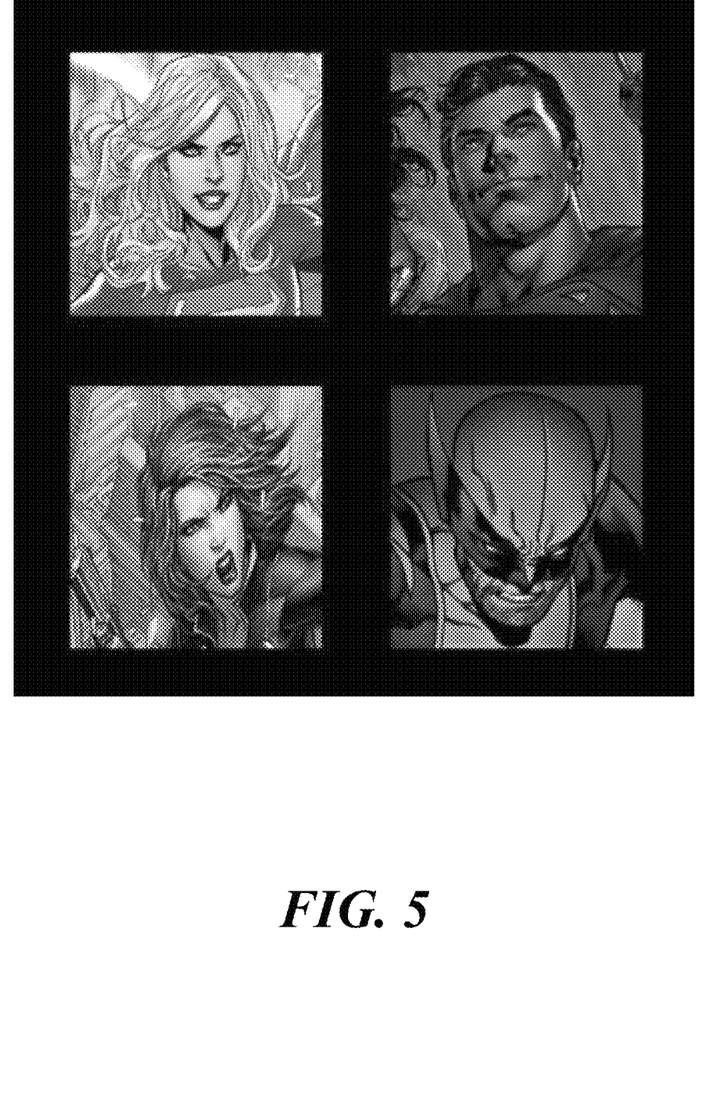
FIG. 5 is an embodiment of a voting interface of the display device of the voting optimization system of FIG. 4 during the voting session in a series of flashes, with the target stimuli enhanced and the remaining stimuli blunted, according to an embodiment of the present disclosure.

As shown in FIG. 4 and FIG. 5, in an embodiment, during at least one voting session, the at least one user may be disposed in front of the display device of the computing device. As such, the display device may be configured to flash a plurality of stimuli, each of the plurality of stimuli comprising at least one candidate selection, on the display device in a predetermined sequence or a random order, such that the at least one user may be required to focus attention on the flashing stimuli one-by-one. In this manner, in an embodiment, the plurality of stimuli may be arranged in the form of a N×N matrix (e.g., a 4×4 square), as shown in FIG. 4. In addition, in some embodiments, each of the plurality of stimuli may appear and/or flash individually on the display device and/or may be arranged in any matrix form and/or any shape and/or design known in the art. Furthermore, in these other embodiments, the plurality of stimuli matrix may be scalable and/or may include any number of stimuli as required.

Moreover, as shown in FIG. 4 and FIG. 5, in an embodiment, the voting optimization system may utilize the plurality of stimuli (e.g., shapes, text, candidate photos, movie posters, superhero images and/or comic book images) to represent various voting options, as the plurality of stimuli are displayed on the display device. In this embodiment, initially, in a standby stage (e.g., when it is not in the flashing stage) the plurality stimuli may appear as a blunted (e.g., grey and/or black colored image), but in the flashing stage at least one of the plurality of stimuli may transition between the into at least one enhanced state (e.g., bright colored and/or enhanced image), such that the at least one user may clearly visual and/or focus on the at least one stimulus of the plurality of stimuli in the flashing stage. Furthermore, in this embodiment, the rows and/or columns of this matrix may flash in a random sequence or a predetermined sequence at regular or irregular intervals. For example, in some embodiments, the row and/or column of the matrix comprising the at least one stimulus of the plurality of stimuli in the flashing stage may flash in a predetermined sequence at an interval of at least 100 ms.

In an embodiment, the voting optimization system may also be configured to conduct each voting session for a predetermined amount of flashes and/or series for each stimulus of the plurality of stimuli. As such, the voting optimization system, via the display device, may be configured to provide the at least one user enough time to accurately focus on the target correlating to their desired candidate. Accordingly, in this embodiment, the neurological headset of the voting optimization system may be configured to record and/or transmit the electrical activity of the brain of the at least one user during each voting session, as P300 event-related potentials are evoked in the at least one user during the times when the rows and columns containing the target stimulus (e.g., the image correlating to the desired candidate of the at least one user) is flashed.

Additionally, as shown in FIG. 5, in an embodiment, the each of the plurality of stimuli may be required to transition between dark colors to brighter and/or enhanced colors as the transition may act as a visual stimulus for the at least one user, such that a P300 data sample may be generated in the electrical activity of the brain of the at least one user. In some embodiments, the transition may be caused by an auditory stimulus, a tactile stimulus, and/or any stimulus known in the art which may generate a P300 data sample wave in the electrical activity of the brain of the at least one user. Accordingly, the voting optimization system may be configured to input the P300 data sample of the brain data of the at least one user, such that the voting optimization system may be configured to identify the target candidate of the at least one user. In this manner, the voting optimization system may be configured to output a prediction of the target candidate of the at least one user and/or the voting optimization system may be configured to cast a vote for the target candidate of the at least one user.

Referring again to FIG. 1, in conjunction with FIGS. 2-5, in an embodiment, method 100 next turns to step 108, identifying, via the computing device, at least one P300 data sample of the at least one user during the at least one voting session. As such, after the voting session is completed, in this embodiment, the computing device may receive the electrical activity dataset of the at least one user from the neurological headset and/or the memory of the computing device. Once the computing device receives the electrical activity dataset, the dataset may then be pre-processed, such that electrical activity dataset from the brain of the at least one user of all voting sessions may be combined and/or filtered to get the relevant P300 data sample within the appropriate frequency range. For example, in some embodiments, the voting optimization system may filter the electrical activity in a range of at least 1 Hz to at most 7 Hz, encompassing every integer in between. In this manner, after the voting optimization system filters the electrical activity dataset of the at least one user, the electrical activity dataset of the at least one user may be separated into P300 data samples and non-P300 data samples. In an embodiment, the electrical activity dataset may be separated by extracting data after a predetermined amount of time after the intensification of each target stimulus and/or non-target (e.g., the image that does not correlate to the desired candidate of the at least one user) stimuli, respectively. For example, in some embodiments, the data samples may be extracted after at least 400 ms after the intensification of each target stimulus and/or non-target stimulus. Additionally, in this these other embodiments, the P300 data sample and/or the non-P300 data may then be averaged (e.g., moving average) and/or decimated.

Moreover, in an embodiment, after the dataset and/or the P300 data sample have been filtered, the voting optimization system may be configured to implement at least one machine learning (hereinafter "ML") algorithm to predict and/or cast the vote of the user. As such, in this embodiment, the voting optimization system may be configured to assign the processed P300 and/or non-P300 samples class labels +1 and/or −1, respectively, such that the processed P300 and/or non-P300 samples may then be into the ML algorithm as input for training. Additionally, the voting optimization system may comprise at least one classifier, such as a Linear Discriminant Analysis (hereinafter "LDA") classifier, such that at least one vector based off the electrical activity dataset may be trained.

As shown in FIG. 1, in conjunction with FIGS. 2-5, at the next step, step 110, of method 100, in an embodiment, the voting optimization system may be configured to query the at least one P300 data sample of the at least one user based on the electrical activity of the brain of the at least one user during the voting session and at least one trained data set. Accordingly, during the voting session, at step 112 of method 100, as shown in FIG. 1, the classifier may be configured to predict the resultant row and/or column of the target stimuli via calculating the maximum of the sum of the weighted feature vectors (e.g., the at least one trained vector off the electrical activity dataset) for the respective rows and/or columns, such that the voting optimization system may accurately predict and/or cast the vote of the at least one user for the desired candidate of the at least one user correlated to the target stimulus. As such, in this embodiment, the classifier may be configured to determine a likelihood of accuracy (e.g., percent chance of accuracy of the prediction of the target stimuli by the voting optimization system) based on the comparison between the maximum of the sum of the weighted feature vectors for the respective rows and/or columns (e.g., P300 data sample) and the at least one trained dataset.

In this manner, as shown in FIG. 1, in conjunction with FIGS. 2-5, in an embodiment, method 100 then proceeds to either step 114 or step 116, depending on whether a substantial match exists between the P300 data sample and the at least one brain frequency and/or wave of the at least one trained dataset. Accordingly, in this embodiment, the voting optimization system may comprise the following equations to determine if substantial match exists between the P300 data sample and the at least one brain frequency and/or wave of the at least on trained dataset, as shown below, to accurately predict the resultant row and/or column, respectively, of the target stimulus:

$$\text{predicted(row)} = \text{argmax}_{rows}[\Sigma_{i_{row}} w \cdot x_{i_{row}}] \quad (1)$$

$$\text{predicted(column)} = \text{argmax}_{columns}[\Sigma_{i_{column}} w \cdot x_{i_{column}}] \quad (2)$$

In the equations above, w represents vector of classification weights; $x_{i_{row}}$ represents a row feature vector; and $x_{i_{column}}$ represents a column feature vector. The predicted target stimulus, as shown in FIG. 5, was then determined by taking the intersection of the predicted row and column in the matrix.

As shown in FIG. 1, during step 114, in an embodiment, the processor of the computing device may determine that a substantial match exists between the P300 data sample and the at least one brain frequency and/or wave of the at least one trained dataset, via equations (1) and (2). As such, during step 114, the processor may execute instructions to cast a vote for the target stimulus (e.g., the candidate and/or item corresponding to the target stimulus) and/or transmit a notification to the at least one user indicative to a successful vote cast. In this embodiment, the processor may transmit the notification to the display device of the computing device. In addition, the voting optimization system may activate a speaker communicatively coupled to the computing device such that the notification may be audibly heard by the user. Furthermore, in this embodiment, the voting optimization system may be configured to transmit the notification to a mobile device of the at least one user via SMS and/or email, and/or may transmit the notification to the at least one user any way known in the art.

Additionally, in an embodiment, the voting optimization system may execute instructions to display a confirmation notification on the display device of the computing device, such that the at least one user may additionally confirm that the vote was correctly or incorrectly cast, via a user input on the graphical-user interface, before the vote may be tallied and/or cast by the voting optimization system. In this embodiment, the processor may transmit the confirmation notification to the display device of the computing device, such that the voting optimization system may be configured to activate a speaker communicatively coupled to the computing device so that the user may audibly hear the notification. Moreover, in this embodiment, the voting optimization system may be configured to transmit the confirmation notification to a mobile device of the at least one user via SMS and/or email, and/or may transmit the confirmation notification to the at least one user any way known in the art.

Another aspect and/or feature of the present disclosure is that the voting optimization system may be configured to train, retrain, and/or update a voting dataset. Accordingly, in an embodiment, during the training, the classifier may be configured to learn the characteristics of P300 and/or non- P300 data, such that the classifier may store the characteristics of the P300 and/or non-P300 data in the form of a model file in the neurological headset, the memory of the computing device, and/or a server communicatively coupled to the neurological headset and/or the computing device. As such, after the voting step, the collected characteristic data (e.g., EEG data) may be preprocessed using the steps described above and/or then passed to this saved model within the memory of the computing device. In this manner, in this embodiment, the classifier may then be configured to predict the vote of the least on user and/or cast the vote of the at least one user by detecting which stimulus produced the P300 event-related potential in the brain activity of the at least one user.

As shown in FIG. 1, subsequent to step 114, next at step 118 and/or step 120, in an embodiment, the voting optimization may be configured to input the at least one P300 data sample and/or the electrical activity dataset of the brain of the at least one user into the at least one trained data set, such that the at least one trained data set may be configured to retrained based on the P300 data sample and/or the at least one electrical activity of the at least one user. In this manner, in this embodiment, a prediction threshold of the at least one trained data set may be updated based on the at least one retrained data set, allowing the voting optimization system to optimize the prediction threshold of the at least one trained dataset increasing an accuracy of the prediction threshold and/or vote casting for the at least one user, relative to the target stimulus.

Moreover, in an embodiment, the voting optimization system may be configured to decrease the predetermined amount of flashes and/or series required to determine the target stimulus of the at least one user. Accordingly, in this embodiment, the voting optimization system may be configured to correlate the P300 data sample to the at least one user. As such, when the same at least one user performs an alternative voting session with the voting optimization system, the voting optimization system may be configured to immediately identify the P300 data sample to the user, decreasing and optimizing the amount of flashes and/or series required to accurately predict and/or cast the vote for the at least one user. Furthermore, in this embodiment, the voting optimization system may be configured correlate the P300 data sample of the at least one user to at least one additional and/or alternative target stimuli (e.g., candidates of a similar party, candidates with similar voting records and/or values, DC@ comic book characters, Marvel® comic book characters, and/or types of foods). In this manner, in this embodiment, the voting optimization system may be configured to readily predict and/or vote for the at least one additional and/or alternative target stimuli during the original voting session and/or at least one additional and/or alternative voting session, decreasing and optimizing the required amount of flashes and/or series to predict and/or cast the vote for the at least one user during the at last one additional and/or alternative voting session.

As shown in FIG. 1, in an embodiment, during step 116, the processor of the computing device determines that a substantial match does not exist between the P300 data sample and the at least one brain frequency and/or wave of the at least one trained dataset. As such, during step 116, the processor executes instructions to transmit a notification to the at least one user indicative of an unsuccessful vote cast and/or restart the voting session or begin a new voting session. In an embodiment, the processor may transmit the notification to the display device of the computing device. In addition, the processor of voting optimization system may activate the speaker communicatively coupled to the computing device such that the notification may be audibly heard by the user. Moreover, in this embodiment, the processor of the voting optimization system may be configured to transmit the notification to a mobile device of the at least one user via SMS and/or email and/or may transmit the notification to the at least one user any way known in the art.

Additionally, in an embodiment, the processor may be configured to execute instructions to display a query notification on the display device of the computing device, such that the at least one user may additionally confirm that the vote was unsuccessful, via a user input on the graphical-user interface. In this manner, the processor of the voting optimization system may be configured to execute instructions to display a query notification on the display device of the computing device, such that the at least one user may additionally confirm if the at least one user may want to restart the voting session and/or proceed to the next voting session before returning to the unsuccessful voting session. As such, in this embodiment, when the at least one user confirms that the vote was unsuccessful and/or if the at least one user wants to restart the voting session, the voting optimization system may be configured to restart the original at least one voting session, such that the original plurality of stimuli may be displayed on the display device associated with the computing device of the voting optimization system. Furthermore, in some embodiments, the voting optimization system may be configured to increase and/or decrease the total amount of voting sessions based on the original unsuccessful voting session. In an embodiment, the processor may transmit the notification to the display device of the computing device. In addition, the processor of voting optimization system may activate the speaker communicatively coupled to the computing device such that the notification may be audibly heard by the user. Moreover, in this embodiment, the processor of the voting optimization system may be configured to transmit the notification to a mobile device of the at least one user via SMS and/or email and/or may transmit the notification to the at least one user any way known in the art.

The following example(s) is (are) provided for the purpose of exemplification and is (are) not intended to be limiting.

EXAMPLES

Example 1

Analysis of a P300-Based Brain-Computer Interface for Casting Votes

Several users were conducted to explore and/or evaluate the accuracy of a voting optimization system designed for casting votes via a brain-computer interface and acquire qualitative feedback from the users to get an understanding of their experience after interacting with the system. First, the users completed a pre-experiment survey containing demographic questions. Following this, they interacted with the voting optimization system. For the experiment, the users had to complete six training sessions and five online voting tasks while wearing the EEG device.

Subsequently, as shown in FIG. 2 and FIG. 3, the users placed the BCI device on their scalp and using a neurological software (e.g., Neuroelectrics Instrument Controller (NIC2), ensured that the headset had successful contact with the scalp with proper signal quality. The users then completed six training sessions while using the Neuro-Voting BCI application. During each session, the EEG data of the users was recorded while they focused attention on the flashing images of the four superheroes one by one. The four superhero images were arranged in a 2×2 matrix, as shown in FIG. 4 and FIG. 5 and the rows and the columns of the matrix flashed in a random sequence with regular intervals of 100 ms. Each session continued for 20 series of flashes with four flashes in each series and P300 event-related potentials were elicited in the user, during the times when the rows and the columns containing the target superhero character were flashed.

Following the sixth training session, a rest period of five minutes was given to the users.

During this time, the acquired EEG data was preprocessed and then trained by the Linear Discriminant Analysis (LDA) classifier. Following the rest period, the users engaged in the online voting task in which they were instructed to complete the following five tasks:

Task 1—Vote for Supergirl.
Task 2—Vote for Wolverine.
Task 3—Vote for Superman.
Task 4—Vote for Black Widow.
Task 5—Vote for the superhero character of your choice.

During the first four voting tasks, the user had to vote for Supergirl, wolverine, superman and black widow, respectively, by focusing on the corresponding superhero image. In the last voting task, the users had to vote for the superhero character of their choice. The entire experimental procedure took about one hour and fifteen minutes.

TABLE 1 shows the results and the average accuracy scores obtained by the users for each of the five tasks. As seen in the table, for a task, "Yes" represents that the application was able to correctly predict the vote of the user and "No" represents that the application was not able to correctly predict the vote. Four users (P02, P03, P04 and P05) were able to cast their votes in all the five tasks with 100% accuracy, however, one user (P01) could only get one task correct. The average accuracy for this user was 20%. The poor performance of this user could potentially be due to fatigue and their inability to focus on the tasks, as they participated during the mid-term exams at their respective collegiate university.

TABLE 1

| User ID | Task 1 | Task 2 | Task 3 | Task 4 | Task 5 | Average Accuracy |
|---|---|---|---|---|---|---|
| P01 | No | No | Yes | No | No | 20% |
| P02 | Yes | Yes | Yes | Yes | Yes | 100% |
| P03 | Yes | Yes | Yes | Yes | Yes | 100% |
| P04 | Yes | Yes | Yes | Yes | Yes | 100% |
| P05 | Yes | Yes | Yes | Yes | Yes | 100% |

The results obtained from the users showed that the voting optimization system can accurately predict the votes of the users as out of five users, four were able to cast their votes with 100% accuracy. This indicates that the proposed application is a reliable voting system as it can guess the votes of the users with high accuracy. As seen in TABLE 1, one of the five users (P01) only got 20% accuracy. This potentially happened due to their lack of concentration during the voting task as in an audio interview, this user mentioned that they were feeling tired and were unable to focus. The application received positive feedback from the users. They found the proposed voting system interesting and intuitive and indicated that they could foresee this type of voting system to be implemented in the future.

As such, the voting optimization would be beneficial to people who are diagnosed with ALS and have limited physical mobility, allowing them to vote without requiring any assistance. In addition, the use of this application could potentially remove the problem of forged voter IDs, as users have unique patterns of brain activities and it would be difficult for a user to use another user's profile to vote. The accuracy results obtained were promising as the application was able to predict the votes of majority of users with 100% accuracy.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

Bederson, B. B., Lee, B., Sherman, R. M., Herrnson, P. S., Niemi, R. G.: Electronic voting system usability issues. In: Proceedings of the SIGCHI conference on Human factors in computing systems. pp. 145-152 (2003)

Botrel, L., Holz, E. M., Kubler, A.: Brain painting v2: evaluation of p300-based brain-computer interface for creative expression by an end-user following the user-centered design. Brain-Computer Interfaces 2(2-3), 135-149 (2015)

Farwell, L. A., Donchin, E.: Talking off the top of your head: toward a mental prosthesis utilizing event-related brain potentials. Electroencephalography and clinical Neurophysiology 70(6), 510-523 (1988)

Hoffmann, U., Garcia, G., Vesin, J. M., Diserens, K., Ebrahimi, T.: A boosting approach to p300 detection with application to brain-computer interfaces. In: Conference Proceedings. 2nd International IEEE EMBS Conference on Neural Engineering, 2005. pp. 97-100. IEEE (2005)

Kaplan, A. Y., Shishkin, S. L., Ganin, I. P., Basyul, I. A., Zhigalov, A. Y.: Adapting the p300-based brain-computer interface for gaming: a review. IEEE Transactions on Computational Intelligence and AI in Games 5(2), 141-149 (2013)

Krusienski, D. J., Sellers, E. W., Cabestaing, F., Bayoudh, S., McFarland, D. J., Vaughan, T. M., Wolpaw, J. R.: A comparison of classification techniques for the p300 speller. Journal of neural engineering 3(4), 299 (2006)

Manyakov, N. V., Chumerin, N., Combaz, A., Van Hulle, M. M.: Comparison of classification methods for p300 brain-computer interface on disabled subjects. Computational intelligence and neuroscience 2011 (2011)

McClinton, W., Caprio, D., Laesker, D., Pinto, B., Garcia, S., Andujar, M.: P300-based 3d brain painting in virtual reality. In: Extended Abstracts of the 2019 CHI Conference on Human Factors in Computing Systems. pp. 1-6 (2019)

McClinton, W., Garcia, S., Andujar, M.: An immersive brain painting: the effects of brain painting in a virtual reality environment. In: International Conference on Human-Computer Interaction. pp. 436-445. Springer (2019)

Mugler, E. M., Ruf, C. A., Halder, S., Bensch, M., Kubler, A.: Design and implementation of a p300-based brain-computer interface for controlling an internet browser. IEEE Transactions on Neural Systems and Rehabilitation Engineering18(6), 599-609 (2010)

Ruiz-Blondet, M. V., Jin, Z., Laszlo, S. Cerebre: A novel method for very high accuracy event-related potential biometric identification. IEEE Transactions on Information Forensics and Security 11(7), 1618-1629 (2016)

Sellers, E. W., Donchin, E.: A p300-based brain-computer interface: initial tests by ALS patients. Clinical neurophysiology 117(3), 538-548 (2006)

Szafir, D., Mutlu, B.: Artful: adaptive review technology for flipped learning. In: Proceedings of the SIGCHI Conference on Human Factors in Computing Systems. pp. 1001-1010 (2013)

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A method of automatically predicting a vote, casting a vote, or both, the method comprising:
    presenting, via a processor of a computing device, a plurality of stimuli on a display device associated with the computing device to a user for a predetermined amount of time;
    recording, via a neurological headset communicatively coupled to the processor of the computing device, an electrical activity of a brain of the user, based on a response to each of the plurality of stimuli presented on the display device;
    comparing, via the processor of the computing device, the electrical activity of the brain of the user for each stimuli of the plurality of stimuli to a predetermined electrical activity associated with a selection by the user; and
    automatically predicting, casting, or both, via the processor of the computing device, the vote of the user by:
        based on a determination that the electrical activity of the brain of the user for a stimuli of the plurality of stimuli matches the predetermined electrical activity of the brain associated with the selection by the user, transmitting a notification indicative of a successfully predicted vote, casted vote, or both to the display device associated with the computing device; and
        based on a determination that the electrical activity of the brain of the user for a stimuli of the plurality of stimuli does not match the predetermined electrical activity of the brain associated with the selection by the user, re-presenting the plurality of stimuli for the predetermined amount of time.

2. The method of claim 1, wherein the processor further comprises at least one machine learning algorithm, at least one classifier or both.

3. The method of claim 2, further comprising the step of, filtering, via the at least one classifier of the processor, at least one P300 event-related potential from the electrical activity of the brain of the user.

4. The method of claim 3, wherein the computing device further comprises a memory, wherein the electrical activity associated with a selection by the user is inputted into the memory of the computing device.

5. The method of claim 4, wherein electrical activity associated with a selection by the user comprises at least one predetermined P300 event-related potential.

6. The method of claim 5, wherein the step of comparing the electrical activity of the brain of the user for each stimuli of the plurality of stimuli to an electrical activity associated with a selection by the user further comprises the step of, identifying, via the at least one classifier of the processor, the selected stimuli of the plurality of stimuli based on the filtered P300 event-related potential.

7. The method of claim 6, wherein the step of comparing the electrical activity of the brain of the user for each stimuli of the plurality of stimuli to an electrical activity associated with a selection by the user further comprises the step of, calculating, via the at least one classifier of the processor, a likelihood of accuracy for the selected stimuli based on the comparison between the filtered P300 event-related potential and the at least one predetermined P300 event-related potentials dataset.

8. The method of claim 6, further comprising the step of inputting, via the processor of the computing device, the filtered P300 even-related potential into the at least one predetermined P300 event-related potentials dataset.

9. The method of claim 8, further comprising the step of retraining, via the at least one machine learning algorithm of the processor, the likelihood of accuracy of the at least one predetermined P300 event-related potentials dataset based on at least one of the inputted filtered P300 event-related potential of the user, wherein the predetermined amount of time for presenting the plurality of stimuli is updated.

10. The method of claim 1, wherein the plurality of stimuli are presented on the display device as a N×N matrix.

11. The method of claim 1, wherein the step of presenting the plurality of stimuli, further comprises the step of, transitioning, via the processor of the computing device, each of the plurality of stimuli between a gray-scale color to an enhanced color scheme at a predetermined rate.

12. A voting optimization system for automatically predicting, casting, or both a vote, the voting optimization system comprising:
    a computing device having a processor;
    a neurological headset having a display device, the neurological headset being communicatively coupled to the processor; and
    a non-transitory computer-readable medium operably coupled to the processor, the computer-readable medium having computer-readable instructions stored thereon that, when executed by the processor, cause the voting optimization system to automatically predict, cast, or both the vote of a user by executing instructions comprising:
        presenting, via the processor of the computing device, a plurality of stimuli on the display device to the user for a predetermined amount of time;
        recording, via the neurological headset communicatively coupled to the processor of the computing device, an electrical activity of a brain of the user, based on a response to each of the plurality of stimuli presented on the display device;
        comparing, via the processor of the computing device, the electrical activity of the brain of the user for each stimuli of the plurality of stimuli to a predetermined electrical activity associated with a selection by the user; and automatically predicting, casting, or both, via the processor of the computing device, the vote of the user by:

based on a determination that the electrical activity of the brain of the user for a stimuli of the plurality of stimuli matches the predetermined electrical activity of the brain associated with the selection by the user, transmitting a notification indicative of a successfully predicted vote, casted vote, or both to the display device; and based on a determination that the electrical activity of the brain of the user for a stimuli of the plurality of stimuli does not match the predetermined electrical activity of the brain associated with the selection by the user, re-presenting the plurality of stimuli for the predetermined amount of time.

13. The voting optimization system of claim 12, wherein the processor further comprises at least one machine learning algorithm, at least one classifier or both.

14. The voting optimization system of claim 13, wherein the executed instructions further comprise the step of, filtering, via the at least one classifier of the processor, at least one P300 event-related potential from the electrical activity of the brain of the user.

15. The voting optimization system of claim 14, wherein the computing device further comprises a memory, wherein the electrical activity associated with a selection by the user is inputted into the memory of the computing device.

16. The voting optimization system of claim 15, wherein electrical activity associated with a selection by the user comprises at least one predetermined P300 event-related potential.

17. The voting optimization system of claim 16, wherein the executed instructions step of comparing the electrical activity of the brain of the user for each stimuli of the plurality of stimuli to an electrical activity associated with a selection by the user further comprises the step of, identifying, via the at least one classifier of the processor, the selected stimuli of the plurality of stimuli based on the filtered P300 event-related potential.

18. The voting optimization system of claim 17, wherein the executed instructions step of comparing the electrical activity of the brain of the user for each stimuli of the plurality of stimuli to an electrical activity associated with a selection by the user further comprises the step of, calculating, via the at least one classifier of the processor, a likelihood of accuracy for the selected stimuli based on the comparison between the filtered P300 event-related potential and the at least one predetermined P300 event-related potentials dataset.

19. The voting optimization system of claim 17, wherein the executed instructions further comprises the step of inputting, via the processor of the computing device, the filtered P300 even-related potential into the at least one predetermined P300 event-related potentials dataset.

20. The voting optimization system of claim 19, wherein the executed instructions further comprise the step of retraining, via the at least one machine learning algorithm of the processor, the likelihood of accuracy of the at least one predetermined P300 event-related potentials dataset based on at least one of the inputted filtered P300 event-related potential of the user, wherein the predetermined amount of time for presenting the plurality of stimuli is updated.

* * * * *